US010483765B2

(12) United States Patent
Pedersen (10) Patent No.: US 10,483,765 B2
(45) Date of Patent: Nov. 19, 2019

(54) POWER GENERATION AND DISTRIBUTION SYSTEM FOR OFFSHORE DRILLING UNITS

(71) Applicant: MAERSK DRILLING A/S, Lyngby (DK)

(72) Inventor: John Røn Pedersen, Frederikssund (DK)

(73) Assignee: MAERSK DRILLING A/S, Kgs. Lyngby (DK)

( * ) Notice: Subject to any disclaimer, the term of this patent is extended or adjusted under 35 U.S.C. 154(b) by 157 days.

(21) Appl. No.: 15/552,276

(22) PCT Filed: Feb. 22, 2016

(86) PCT No.: PCT/DK2016/000006
§ 371 (c)(1),
(2) Date: Aug. 19, 2017

(87) PCT Pub. No.: WO2016/131460
PCT Pub. Date: Aug. 25, 2016

(65) Prior Publication Data
US 2018/0034280 A1   Feb. 1, 2018

(30) Foreign Application Priority Data

Feb. 20, 2015   (DK) ............................ PA 2015 00099
Jul. 20, 2015   (DK) ............................ PA 2015 00424
Dec. 7, 2015   (DK) ............................ PA 2015 00789

(51) Int. Cl.
*H02J 5/00*   (2016.01)
*E21B 41/00*   (2006.01)
(Continued)

(52) U.S. Cl.
CPC ................. *H02J 5/00* (2013.01); *E21B 41/00* (2013.01); *H01F 27/24* (2013.01); *H01F 27/28* (2013.01);
(Continued)

(58) Field of Classification Search
CPC ..... E21B 41/00; H02J 3/30; H02J 3/32; H02J 3/38; H02J 4/00; H02J 5/00; H02J 5/005
(Continued)

(56) References Cited

U.S. PATENT DOCUMENTS

| 7,633,248 | B1 | 12/2009 | Williams |
| 9,065,300 | B2 | 6/2015 | Williams |

(Continued)

FOREIGN PATENT DOCUMENTS

| CN | 204098776 U | 1/2015 |
| CN | 204103484 U | 1/2015 |

(Continued)

OTHER PUBLICATIONS

Danish Search Report corresponding to Danish Patent Application No. 2015 00099, dated Sep. 11, 2015.
(Continued)

*Primary Examiner* — William Hernandez
(74) *Attorney, Agent, or Firm* — Lathrop Gage LLP (57) ABSTRACT

A power generation and distribution system for a drilling rig includes (1) an AC bus and a DC bus, (2) an AC generator electrically connected to the AC bus, (3) an AC bus load electrically connected to the AC bus, (4) a first power transformer configured to convert a plurality of voltage phases of the AC bus into a plurality of corresponding secondary side voltage phases, (5) a first unidirectional AC-DC power converter connected between the secondary side voltage phases of the first power transformer and the DC bus, (6) one or more DC bus loads connected to the DC bus, and (7) a second AC-DC power converter connected between the DC bus and at least one of an auxiliary transformer winding of the first power transformer and a second power transformer for supplying power from the DC bus to the AC bus.

20 Claims, 3 Drawing Sheets

(51) Int. Cl.
    *H01F 27/24*    (2006.01)
    *H01F 27/28*    (2006.01)
    *H02J 3/30*     (2006.01)
    *H02J 3/32*     (2006.01)
    *H02J 3/38*     (2006.01)
    *H02P 9/02*     (2006.01)
    *H02J 4/00*     (2006.01)
    *E21B 19/00*    (2006.01)
    *H02P 27/06*    (2006.01)
    *H02J 3/14*     (2006.01)

(52) U.S. Cl.
    CPC ............... *H02J 3/30* (2013.01); *H02J 3/32* (2013.01); *H02J 3/38* (2013.01); *H02J 4/00* (2013.01); *H02P 9/02* (2013.01); *E21B 19/008* (2013.01); *H02J 3/14* (2013.01); *H02P 27/06* (2013.01); *Y02E 60/16* (2013.01)

(58) Field of Classification Search
    USPC ......... 307/11, 17, 19, 21, 22, 23, 25, 26, 29, 307/116, 125, 126, 130
    See application file for complete search history.

(56) References Cited

U.S. PATENT DOCUMENTS

| | | | |
|---|---|---|---|
| 10,008,856 B2 * | 6/2018 | Pan | ............... H02J 11/00 |
| 2008/0203734 A1 | 8/2008 | Grimes et al. | |
| 2009/0195074 A1 | 8/2009 | Buiel | |
| 2013/0029543 A1 | 1/2013 | Gjerpe | |
| 2013/0166084 A1 | 6/2013 | Sedighy et al. | |
| 2013/0313894 A1 | 11/2013 | Settemsdal | |
| 2014/0077607 A1 * | 3/2014 | Clarke | ............... H02J 3/005 307/75 |
| 2015/0039145 A1 | 2/2015 | Yang et al. | |
| 2018/0097452 A1 * | 4/2018 | Chapman | ............ H02S 40/32 |

FOREIGN PATENT DOCUMENTS

| | | |
|---|---|---|
| EP | 2595265 A1 | 5/2013 |
| EP | 2654157 A1 | 10/2013 |
| EP | 2709229 A1 | 3/2014 |
| GB | 2445382 A | 7/2008 |
| WO | 2008102166 A1 | 8/2008 |
| WO | 2009052843 A1 | 4/2009 |
| WO | 2014177346 A1 | 11/2014 |

OTHER PUBLICATIONS

Danish Search Report corresponding to Danish Patent Application No. 2015 00789, dated Jan. 26, 2016.
Danish Search Report corresponding to Danish Patent Application No. 2015 00424, dated Feb. 11, 2016.
International Search Report corresponding to International Patent Application No. PCT/DK2016/000006, dated May 25, 2016.

* cited by examiner

POWER GENERATION AND DISTRIBUTION SYSTEM FOR OFFSHORE DRILLING UNITS

The present invention relates to power generation and distribution system suitable for use in a variety of applications such as Mobile Offshore Drilling Units and fixed offshore installations including various types of seaborne vessels, drilling rigs etc.

In the field of oil/gas well drilling significant amounts of power are required during the drilling activity. The power requirements as used on a drilling rig serve to supply the hoisting system such as drawworks, winches, HPU for hydraulic based hoisting system on the drill floor and numerous other types of electric loads like electric thrusters, mud pumps, top drives, rotary tables, dynamic braking systems and other electrical loads. Equipment utilized in hydrocarbon well drilling activities often comprises oversized power systems to accommodate the "peak" power requirements of all electric loads coupled to the energy generation and distribution system of the drilling rig. Historically, the number of typically active engines/generators is more than the number required by the load of the application due to redundancy and necessary peak power demand during certain phases of the operation as discussed below.

Drilling rigs may be provided with dynamic positioning systems comprising electrically driven propellers, i.e. electric thrusters, powered by the energy generation system of the drilling rig. The task of the dynamic positioning systems is to keep a desired position of the drilling rig in the sea during oil and gas drilling operations. For certain types of high risk operations, it is vital that a desired position in the sea of the drilling rig and essential rig operations can be maintained as otherwise there may be an increased risk of oil pollution, loss of life or loss of well. Integrity and failure safe operation of energy generation and distribution system which supplies the power to the multiple thrusters of the drilling rig are therefore of particular importance. The drilling rigs that require dynamic positioning are often classified in different classes such as DP2 (dynamic positioning 2) or DP3 (dynamic positioning 3). To ensure that a malfunction of a component does not lead to a complete blackout of the energy generation of the drilling rig, the energy generation system is often split into several electrically interconnectable power system sections, for example in 2, 3, 4, 5, 6, 7, 8 or even more separate sections. These interconnectable power system sections may all be electrically connected, e.g. in a so-called ring configuration, under normal operating conditions of the system. However, during certain high risk modes of operation or when fault is present in a section, the interconnectable power system sections may be electrically isolated from each other by opening connections made by electric cables—so-called bus tie breakers. Each power system section is often isolated by fireproof and watertight separations. One or more engines/AC generators are active in each of the power system sections to supply electric power to connected AC bus loads such as the electric thrusters. Operating such energy generation with interconnected power system sections, i.e. with connected bus tie breakers, is generally not possible shortly after a system fault, such as a short circuit or diesel generator failure which generally can result in a total blackout of the energy generation and distribution system. The blackout may result in a risk of loss of the position of the drilling rig.

In some embodiments of the energy generation, the impact of a single point failure in a power system section is minimized. The power system section comprises an AC bus subsection divided into first and second segments which are electrically connected through a pair of series connected bus tie breakers housed in physically separate switchboard compartments to selectively connect and disconnect the first and second segments of the AC bus subsection. If one of the first and second switchboard compartments is flooded, or otherwise damaged and faulty, by a single point failure the other switchboard compartment together with its associated segment of the AC bus subsection, AC generator and electric thruster will be undamaged. Hence, the single point failure leads merely to the loss of a single AC generator and a single thruster drive (and its associated thruster).

The previously discussed peak power demands of the drilling rig energy generation exist during certain activities or operations on the drilling rig. These activities or operations includes a so-called "tripping" of the pipe or drill stem in/out of the well, running and retrieving the riser, lifting operations on the drill floor, lifting operations with cranes or other hoisting equipment etc. During normal operations, there is a base load of lighting, pumps, agitators, mixers, air compressors, etc. on the energy generation of the drilling rig. This base load can make up typical loads of 1-5 MW. Mud pumps, top drives and rotary tables contribute another fairly consistent MW range load. This demand will vary based on the particular well, depth of drilling, and material being drilled and equipment used for drilling operations. During oil/gas well drilling activities, the most intermittent load is often the lifting device for the drill floor (i.e. the lifting device for lifting tubulars in and our of the well center and to/into the seabed also referred to as the hoisting system) such as drawworks, winch and HPU (high pressure unit) for lifting cylinders. This intermittent load causes a peak power demand during the raising or lowering of the drill pipe upwardly and downwardly in the well. This peak power demand can be incurred by loads 2-3 times (or more) larger than the base loads of the other demands on the drilling rig. For example, during a drilling operation it may be necessary to retrieve the drill string after finishing a section of the well or to replace the drill bit. This drill string can be 10,000 feet or more. During the tripping in, and particularly when tripping out, of the hole, the driller (operator) demands extreme power consumption in power bursts as the driller raises (or lowers) the string of drill pipe. Since there is a limitation on the height of the drilling mast, the operator must lift the string out in sections (typically in stands of 2 to 4 drill pipes) by lifting a section over the drill floor, stop lifting, break out a stand and rack it back and commence lifting again. This process is reversed during the reinsertion of the drill pipe back into the hole. This process is often referred to as "tripping" in or out of the hole. In some embodiments, the intermittent peak power demand for example occurs when this load (e.g. 300,000 pounds or more) is applied to the electric motor or motors lifting the pipe string over and over again. The load is variable since the weight of the drill stem becomes less and less as pipe sections are removed. The base load requirements for a drilling rig are approximately 1-5 MW or even higher. The peak demand can be more than 3-9 MW or more larger than the base load. Another example of intermittent loads occur when multiple machines are caused to begin operating simultaneously. Such events may be more likely in drilling rigs with advanced automation systems so that a single actuation by the operator can coordinate several machines to begin working towards a particular operation.

To deliver such power bursts without overloading the active engines/generators or requiring an excessive number of simultaneously active engines/generators it is advantageous to deliver power or energy for these power bursts by an energy storage or energy storage via a DC bus or a DC bus subsection of the energy generation. This delivery of power from an energy storage to handle temporary increases in load is often referred to as "peak-shaving".

In some embodiments of the invention the energy storage comprises one or more flywheel energy storage device(s) which may possess several advantageous properties for drilling rig energy generation and distribution systems such as high energy density, long lifetime e.g. more than 10, 15 or 20 years, rapid energy charging and large maximum power output.

In some embodiments the invention relates to a power generation and distribution system for a drilling rig comprising:

an AC bus and a DC bus,
an AC generator electrically connected to the AC bus,
an AC bus load electrically connected to the AC bus,
a first power transformer configured to convert a plurality of voltage phases of the AC bus into a plurality of corresponding secondary side voltage phases,
a first AC-DC power converter connected between the secondary side voltage phases of the first power transformer and the DC bus for supplying power to the DC bus, one or more DC bus loads connected to the DC bus, a second AC-DC power converter connected between the DC bus and at least one of an auxiliary transformer winding of the first power transformer and a second power transformer for supplying power from the DC bus to the AC bus.

The first power transformer may comprise a multi-phase power transformer such as a three-phase transformer. The first power transformer may comprise a plurality of primary side transformer windings, e.g. three windings, and a plurality of secondary side transformer windings, e.g. three windings, wound around a common magnetic core. The auxiliary transformer winding is preferably wound around the common magnetic core to provide a compact transformer structure and efficiently energize the plurality of primary side transformer windings.

The second power transformer may comprise a multi-phase power transformer such as a three-phase transformer. The second power transformer may comprise a plurality of primary side transformer windings, e.g. three windings, and a plurality of secondary side transformer windings, e.g. three windings, wound around a common magnetic core.

Throughout the following, the invention will be discussed in relation to an AC bus with three phases but the skilled person will realize that other number of phases may be applied as well, such as two or six phases.

The auxiliary transformer winding of the first power transformer, or alternatively the second power transformer, enables under certain conditions the DC bus to energize the AC bus via the second AC-DC power converter. Hence, the DC bus may be used to supply power to the electrical load or loads connected directly to the AC bus such as a thruster driver and its associated thruster and other loads some of which may be essential for the offshore rig. Hence, the electrical load may be connected to the AC bus through a load circuit breaker. This ability to energize the AC bus from the DC bus has several advantages. The AC bus may be powered through the auxiliary transformer winding or the second power transformer, during a temporary AC generator failure or interruption. Consequently, the supply of power to the AC bus electrical load or loads may remain intact despite the temporary loss of power from the AC generator. This feature is particularly helpful in an embodiment where the power system comprises an energy storage connected to the DC bus for selectively supplying power to the DC bus and absorbing power from the DC bus. With the ability to energize the AC bus from the DC bus this energy storage may act as a power backup or even an emergency generator for the AC bus. The control of the power supply mode of the energy storage, i.e. whether to supply power to the DC bus or absorb power from the DC bus, may be carried out by a power management controller of the power generation and distribution system or alternatively a local control device associated with various control electronics of the energy storage. The power management controller or local control device may be configured to generating and applying a supply control signal to the energy storage to select or set the power supply mode. This supply control signal may be a digital command issued through a suitable data bus connected between the power management controller and energy storage.

The energy storage may comprise various types of energy storage devices or components for example one or more energy storage devices selected from a group of {a rechargeable battery, a capacitor, a flywheel}. The energy storage may comprise any combination of these one or more energy storage devices since different physical characteristics of different types of energy storage devices may complement each other. Furthermore, an energy storage will typically comprise control logic and/or converters and other circuits for interfacing with the power plant. The energy storage may also be referred to as an energy storage assembly. The energy storage may be arranged to carry out peak-shaving of the DC bus by at least temporarily supplying power to respective peak power demands of the one or more DC bus loads. In some embodiments the power plant is arranged to perform peak shaving of peaks on the AC bus. In some embodiments this is performed by the power management controller, in the event of an increased load on the AC bus, increase power emission from the energy storage on the DC bus resulting in reduced load on the AC bus from the DC bus which in turn leaves more headroom to handle other loads on the AC bus. In some embodiments peak-shaving on AC bus using energy stored in energy storages directly connected to the DC bus is performed when no loads on the DC bus are supplied by the AC bus (either generally when the sections are connected or at one or more isolated DC bus sections) so that power may be directed from the energy storage to the AC bus via at least one of an auxiliary transformer winding of the first power transformer and a second power transformer for supplying power from the DC bus to the AC bus. The situation where there are no loads on the DC bus may occur when these loads are either not in use or completely supplied from other sources such as the energy storage.

The energy storage may serve multiple purposes, it may, for example, be configured to capture and store regenerative energy captured from braking energy of one or several motors of the DC bus electrical loads. This feature decreases power production demands on the AC generator and decreases power conversion loading of the first AC-DC power converter etc.

One embodiment of the energy storage comprises one or more flywheel energy storage devices. The flywheel energy storage device may comprise a bidirectional AC-DC power converter allowing the flywheel energy storage device to either supply power to the DC bus, for example feeding power to the one or more DC bus electrical loads, or absorbing power from the DC bus and storing absorbed power in a flywheel as kinetic energy via an integral AC motor/generator coupled to a rotating wheel member or members of the flywheel. The presence of the first energy storage with the bidirectional power transfer capability to the DC bus subsection entails numerous advantages. The connection of the one or more flywheel energy storage devices to the DC bus has numerous benefits. The flywheel energy storage device has a short response time and high peak power or current supply capability which effectively suppress voltage spikes on the DC bus caused by the previously discussed intermittent peak power loads drawn by the one or more of the DC bus electrical loads, in particular the lifting device for the drill floor for example the drawworks motor. In addition, the flywheel energy storage device may be used to power the AC bus, through a "reverse" energy supply path comprising at least one of the auxiliary transformer windings and the second power transformer for a considerable period of time. This "reverse" energy supply path may be activated by the power management controller to energize the AC bus and the AC bus loads coupled thereto, during the previously discussed temporary AC generator failures or interruptions. This "reverse" energy supply path may be activated by the power management controller to energize the AC bus, and the AC bus loads coupled thereto, during the previously discussed temporary AC generator failures or interruptions. In addition, flywheel based energy storage may be applied to perform peak-shaving on the AC bus either by feeding more of the DC loads or via this "reverse" energy supply path as described above. Flywheels based energy storage are typically suitable for peak shaving because the flywheel energy storage device will typically be able to react much faster, i.e. possess a smaller time constant than the AC generator in response to peaks or bursts in the power consumption of the AC bus load or loads. In some embodiments, the energy storage, e.g. a flywheels, have a response time 50% or less than that of that of the generator system, such as 25% or less, such as 10% or less, such as 5% or less such as 1% or less. In one embodiment the response time is measured as the time to increase the power output with 1 MW. Typically, the flywheel power delivery will be limited by the power electronics and thus multiple flywheels may be required to deliver high peaks (e.g. 6 MW for 1 or 2 seconds). Some of multiple flywheels may be connected directly to separate sections of the DC bus.

The energy storage capacity of the flywheel energy storage device may be sufficiently large, such as 360 MJ or more, such as 500 MJ or more, such as 1200 MJ or more to power large loads on the AC bus for a certain period of time. In one embodiment of the invention, the flywheel energy storage device is configured to power a 5 MW thruster of the drilling rig for at least 5 minutes during a failure of the first AC generator that would have left the AC bus powerless without reverse power supply through the auxiliary transformer winding of the first power transformer or through the second three-phase transformer. Another embodiment of the flywheel energy storage device is configured to power a 6.5 MW thruster for at least 5 minutes with a 50% load. The flywheel device may be a single flywheel or multiple flywheels connected to the same section of the DC bus.

The skilled person will understand that the power generation and distribution system may comprise a plurality of individual flywheel energy storage devices for example more than 2, 4, or 15 individual flywheel energy storage devices. An exemplary embodiment of the power generation and distribution system comprises 18 individual flywheel energy storage devices each possessing an energy storage capacity of 360 MJ to provide a total energy storage capacity of at least 6480 MJ for the system. The 18 individual flywheel energy storage devices may possess a combined peak power supply capability of 6 MW or even larger allowing the flywheels to compensate a large load bursts of the DC bus loads. At least some, and possibly each, of these individual flywheel energy storage devices may be directly connected to the DC bus. If the power generation and distribution system possess a multi-segmented topology comprising inter alia a plurality of connectable DC bus subsections, as discussed below in additional detail, one or several individual flywheel energy storage device(s) may be directly connected to each DC bus subsection or at least some of the DC bus subsections.

The skilled person will understand that the power management controller may use different types of AC bus parameters and other system parameters and criteria to control under which conditions the DC bus should be configured to energize the AC bus or vice versa. According to one such embodiment, the power management controller is configured to:

detecting one or more parameters on the AC bus,
selectively activating and deactivating each of the first AC-DC power converter and the second AC-DC power converter based on the one or more detected parameters of the AC bus. In one embodiment the one or more parameters may comprise an AC voltage of the AC bus.

The skilled person will understand that the power management controller may represent the detected AC voltage on the AC bus in a variety of formats such as RMS voltage, peak voltage, instantaneous voltage, average voltage etc. Some parameters of the AC bus may relate to a duration of a certain AC voltage value or other waveform shape or waveform characteristics of the AC voltage on the AC bus. Other parameters of the AC bus may relate to an AC current or AC power flowing through the AC bus.

The one or more parameters of the AC bus may characterize the electrical integrity of the AC bus.

The AC bus may energize the DC bus when a "forward" energy supply path of the system is active. This "forward" energy supply path extends through the first power transformer and the first AC-DC power converter. The power management controller may be configured to deactivate the second AC-DC power converter when the "forward" energy supply path is activated to eliminate internal power losses of electronic components of the second AC-DC power converter and/or wasteful loading of the auxiliary transformer winding. The second AC-DC power converter may be deactivated by a suitable converter control signal for example halting or removing a clock signal or switching frequency signal of the power converter and/or by disconnecting the DC bus from an input of the second AC-DC power converter for example using circuit breakers or switches.

The DC bus may in contrast energize the AC bus when a "reverse" energy supply path of the system is active where the latter path extends through the second AC-DC power converter and further through either the auxiliary transformer winding of the first power transformer or the second power transformer. The power management controller may be configured to deactivate the first AC-DC power converter to eliminate internal power losses of electronic components of the first AC-DC power converter by a suitable converter control signal for example stopping or removing a clock signal or switching frequency signal of the converter and/or by disconnecting the three secondary side voltage phases produced by the first power transformer.

The power management controller may be configured to detecting an AC voltage on the AC bus and selectively activating and deactivating each of the first AC-DC power converter and the second AC-DC power converter based on the detected AC voltage of the AC bus. This selective activation and deactivation of each of the first and second AC-DC power converters may be based on at least one AC bus voltage threshold for example such that the first AC-DC power converter is active and the second AC-DC power converter inactive when the AC bus voltage lies above the at least one AC bus voltage threshold and vice versa if the AC bus voltage lies below the AC bus voltage threshold. The at least one AC bus voltage threshold may be an absolute voltage level expressed as an RMS, peak or average voltage on the AC bus. Alternatively, the AC bus voltage threshold may be expressed as a certain percentage of a nominal AC voltage of the AC bus. Hence, the power management controller may comprise the at least one AC bus voltage threshold for example stored as data in an electronic memory device of the power management controller; wherein said power management controller is configured to:

comparing the AC voltage on the AC bus to the AC bus voltage threshold and based on the result of the comparison:
deactivating the first AC-DC power converter; and
activating the second AC-DC power converter to energize at least one of the auxiliary transformer windings and the second power transformer from the DC bus. Before deactivating the second AC-DC power converter several checks may be required e.g. to determine that sufficient power from generator are available.

Furthermore, and as noted above, the power management controller may in some embodiments cause the energy storage to perform peak shaving on the AC bus. In some embodiments by causing the energy storage to supply more power to the DC bus in response to AC bus voltage falling below a threshold.

The nominal AC voltage level on the AC bus typically lies between 11 kV and 6.6 kV and the voltage level of the DC bus typically lie between 720 V DC-1000 V DC, but alternative AC voltage levels and DC voltage levels may be used as well.

In some embodiments of the power generation and distribution system each of the AC generator, the AC bus load, the first and second power transformers is directly connected to the AC bus without any intervening AC or DC bus planes or structures. However, in the present patent specification the term "directly" encompasses connections to the AC bus made through intervening electrical components or circuits other than a bus, such as power transformers, power converters, frequency converters, circuit breakers, switches and resistances. Likewise, each of the one or more DC bus loads and the energy storage is preferably directly connected to the DC bus.

The first AC-DC power converter may be a unidirectional power converter configured for transmission of energy from the secondary side voltage phases of the first power transformer to the DC bus. The second AC-DC power converter may be a unidirectional power converter configured for transmission of energy from the DC bus to at least one of the auxiliary transformer winding and the second power transformer. The unidirectional type of power converter possesses several advantageous properties as discussed in further detail below with reference to the appended drawings.

The one or more DC bus loads may comprise at least one of: a lifting device for the drill floor, a mud pump motor, a cement pump motor, a rotary table motor. The lifting device may comprise a hoisting system for example a hoisting system with a lifting capacity larger than 500 tons or larger than 800 tons or larger than 1000 tons or larger than 1200 tons such as larger than 1500 tons.

Some embodiments of the power generation and distribution system may possess a multi-segmented topology comprising a plurality of connectable AC bus subsections and a plurality of connectable DC bus subsections. Hence, the AC bus may comprise a plurality of AC bus subsections wherein each AC bus subsection comprises first and second bus tie breakers for selectively connecting and disconnecting the AC bus subsection to the AC bus; and the DC bus may comprise a plurality of DC bus subsections wherein each DC bus subsection comprises first and second bus tie breakers for selectively connecting and disconnecting the DC bus subsection to the DC bus. In some embodiments, the plurality of AC bus subsections are electrically connected to the AC bus in a ring configuration; and/or the plurality of DC bus subsections are electrically connected to the DC bus in a ring configuration. One or several AC generator(s) may be directly connected to each of the plurality of connectable AC bus subsections. One or several flywheel energy storage device(s) may be directly connected to each of the plurality of connectable DC bus subsections. Each AC bus subsection may be energized by the one or more flywheel energy storage device(s) even under system operating conditions where the AC generator of the AC bus subsection in question fails and the AC bus section is isolated by the first and second bus tie breakers.

Various exemplary embodiments of a multi-segmented power generation and distribution system in accordance with some embodiments of the invention are described below in additional detail with reference to FIG. 3.

In some embodiments the invention relates to a method of generating and distributing power on a drilling rig, said method comprising:

connecting an AC generator to an AC bus and running the AC generator to energize the AC bus with an AC voltage, loading the AC bus by connecting one or more AC loads to the AC bus, monitoring and detecting one or more parameters of the AC bus, comparing the one or more detected parameters to a bus voltage criterion, and if the one or more detected parameters does not match the bus voltage criterion, then activating a first energy supply path from the AC bus to a DC bus to energize the DC bus and deactivating a second energy supply path from the DC bus to the AC bus; or if the one or more detected parameters matches the bus voltage criterion, then deactivating the first energy supply path and activating the second energy supply path from the DC bus to the AC bus to energize the AC bus.

The first energy supply path may comprise:
a first multi-phase power transformer configured to converting a plurality of voltage phases of the AC bus into a corresponding plurality of secondary side voltage phases and a first AC-DC power converter configured to convert the plurality of secondary side voltage phases to a DC voltage; and the second energy supply path comprises:
a second AC-DC power converter connected between the DC bus and at least one of an auxiliary transformer winding of the first power transformer and a second power transformer, wherein a secondary side of the second power transformer is connected to the AC bus.

The method may comprise:
connecting one or more DC bus loads to the DC bus,
connecting a flywheel energy storage device to the DC bus, controlling the flywheel energy storage device to selectively supply stored energy to the DC bus and absorb energy from the DC bus. In some embodiments controlling the flywheel energy storage device to selectively supply stored energy may be in response to an increased load on the DC bus, on the AC bus and/or either on the AC or DC bus.

The method may further comprise supplying energy from the flywheel energy storage device to the AC bus through the second energy supply path.

The energy storage may be arranged to carry out peak-shaving of the DC bus by at least temporarily supplying power to respective peak power demands of the one or more DC bus loads.

In some embodiments the invention relates to a power generation and distribution system for a drilling rig, comprising two or more electrically interconnectable power system sections, wherein each power system section comprises:

an AC bus subsection electrically connectable to a common AC bus of the power generation and distribution system through first and second bus tie breakers connected to respective ends of the AC bus subsection to selectively disconnect and connect the AC bus subsection to the common AC bus, a first AC generator electrically connected to a first segment of the AC bus subsection through a first generator circuit breaker, a first thruster drive electrically connected to the first segment of the AC bus subsection through a first thruster circuit breaker, a second AC generator connected to a second segment of the AC bus subsection through a second generator circuit breaker, a second thruster drive electrically connected to the second segment of the AC bus section through a second thruster circuit breaker, a third bus tie breaker and a fourth bus tie breaker connected in series between the first and second segments of the AC bus subsection to selectively connect and disconnect the first and second segments of the AC bus subsection, wherein the third bus tie breaker is housed in a first switchboard compartment and the fourth bus tie breaker is housed in a second and physically separate switchboard compartment.

In some embodiments each AC bus subsection is only directly connected to a single generator.

Power generation and distribution system in accordance with the present invention may in some embodiments be utilized on various types of drilling rigs such as drillship, semi-submersible rig, jack-up rig, barge or landrig etc.

The first and second switchboard compartments are preferably physically isolated from each other by fireproof and watertight walls of the compartments. There are several noticeable advantages by the use of series connected third and fourth bus tie breakers housed in separate switchboard compartments to separate the first and second segments of the AC bus subsection instead of using a single physical compartment for housing a single bus tie breaker as used in prior art drilling rig power distribution systems. If one of the first and second switchboard compartments is flooded, or otherwise damaged and left in-operational, by a single point failure the other switchboard compartment together with its associated segment of the AC bus subsection and AC generator are left undamaged. Hence, a single point failure within the power generation and distribution system leads merely lead to the loss of a single AC generator and a single thruster drive (and its associated thruster) connected thereto in contrast to the loss of both the first and second AC generators and the first and second thruster drives (and their associated thrusters) in prior art drilling rig power distribution systems. The loss of a single thruster of the drilling rig instead of two thrusters by a single point failure in the present power system section leads to numerous advantages such as a marked decrease of the minimum power requirement to each of the plurality of individual thrusters of the drilling rig—typically four to eight individual thrusters as discussed in additional detail below in connection with the appended drawings. The single point failure may lead to the loss of one switchboard compartment which may house one of both of the first and second AC generators. The AC voltage on the common AC bus typically lie between 11 kV and 6.6 kV.

In one embodiment of the power generation and distribution system the first generator circuit breaker and/or the first thruster circuit breaker is/are arranged inside the first switchboard compartment and the second generator circuit breaker and/or the second thruster circuit breaker is/are arranged inside the second switchboard compartment.

In one embodiment said first bus tie breaker is housed in said first switchboard compartment and/or said second bus tie breaker is housed in said second switchboard compartment.

One embodiment comprises two or more electrically interconnected power system sections such as three or more sections, such as 4 or more sections.

In one embodiment each set of the first and second AC generators of each power system section are housed in a shared generator compartment or room such as a fireproof and/or watertight shared generator room.

In one embodiment the first and second AC generators are separated from each other in separate generator rooms such as fireproof and/or watertight generator rooms.

In one embodiment the power generation and distribution system further comprises: a first power transformer electrically connected between the first segment of the AC bus subsection and a first segment of a DC bus subsection through a first three phase AC-DC power converter, one or more DC bus electrical loads such as a lifting device for the drill floor, a mud pump motor, a cement pump motor, a rotary table motor etc., electrically connected to the first segment of the DC bus subsection, a second power transformer electrically connected between the second segment of the AC bus subsection and a second segment of DC bus subsection through a second three phase AC-DC power converter, one or more DC bus electrical loads such as a drawworks motor, a mud pump motor, a cement pump motor, a rotary table motor etc., electrically connected to the second segment of the DC bus subsection, a DC segment circuit breaker configured to selectively connect and disconnect the first and second segments of the DC bus subsection, wherein the DC bus subsection is electrically connectable to a common DC bus of the power generation and distribution system through first and second DC bus circuit breakers at respective ends of the DC bus subsection to selectively disconnect and connect the DC bus subsection to the common DC bus.

In one embodiment the power generation and distribution system further comprises: a first energy storage, or first energy storage, connected to the first segment of the DC bus subsection to selectively supply power to the first segment of the DC bus subsection and absorb power from the first segment of the DC bus subsection for example in accordance with a supply control signal.

In one embodiment the first energy storage comprises one or more energy storage devices selected from a group of a rechargeable battery, a capacitor, a flywheel. The flywheel energy storage device may possess an energy storage capacity of 360 MJ or more, such as 500 MJ or more, preferably 1200 MJ or more. The flywheel energy storage device may possess sufficient energy to driving the first and second thrusters, e.g. each representing a load of 4-6 MW, to 50% of their respective maximum power for at least 5 minutes. The flywheel energy storage device, including the associated power electronics connecting the flywheel to the bus, may possess a peak power delivery larger than 2.0 MW.

One embodiment of the first energy storage further comprises:

a bidirectional AC-DC power converter coupled between the flywheel energy storage device and the first segment of the DC bus subsection;

a motor controller configured to select a direction of electrical power transfer of the first energy storage in accordance with the supply control signal.

In one embodiment the respective AC bus subsections of the two or more power system sections are electrically connected to the common AC bus in a ring configuration. The respective DC bus subsections of the two or more power system sections may be electrically connected to the common DC bus in a ring configuration.

One embodiment of the power generation and distribution system further comprises:

a plurality (e.g. six) of individual main transformer windings wound around a common magnetic core of the first power transformer to convert three individual voltage phases of the first segment of the AC bus subsection to three corresponding voltage phases at a lower AC voltage level; and a further transformer winding wound around the common magnetic core to energize the first segment of the AC bus subsection via the plurality of individual main transformer windings, a first AC-DC power converter coupled from the first segment of the DC bus subsection to the further transformer winding of the first power transformer to energize the further transformer winding from the first segment of the DC bus subsection.

One embodiment of the power generation and distribution system further comprises a voltage controller. The voltage controller may be configured to:

monitoring an AC voltage or AC voltage level on the first segment of the AC bus subsection, selectively activate and deactivate the first AC-DC power converter based on the AC voltage such that the further transformer winding is energized by the AC-DC power converter if the AC voltage level or AC voltage meets a predetermined voltage criteria.

As mentioned above, the controller may also cause the energy storage to increase the flow of energy to the DC bus.

In one embodiment the first three phase AC-DC power converter may be a unidirectional power converter configured for transmitting power from the first power transformer to the first segment of the DC bus subsection.

BRIEF DESCRIPTION OF THE DRAWINGS

Preferred embodiments of the invention will be described in more detail in connection with the appended drawings, in which.

DESCRIPTION OF PREFERRED EMBODIMENTS

In the following various exemplary embodiments of the power generation and distribution system are described with reference to the appended drawings. The skilled person will understand that the accompanying drawings are schematic and simplified for clarity and therefore merely show details which are essential to the understanding of the invention while other details have been left out. Like reference numerals refer to like elements throughout. Like elements will, thus, not necessarily be described in detail with respect to each figure.

Figure 1:
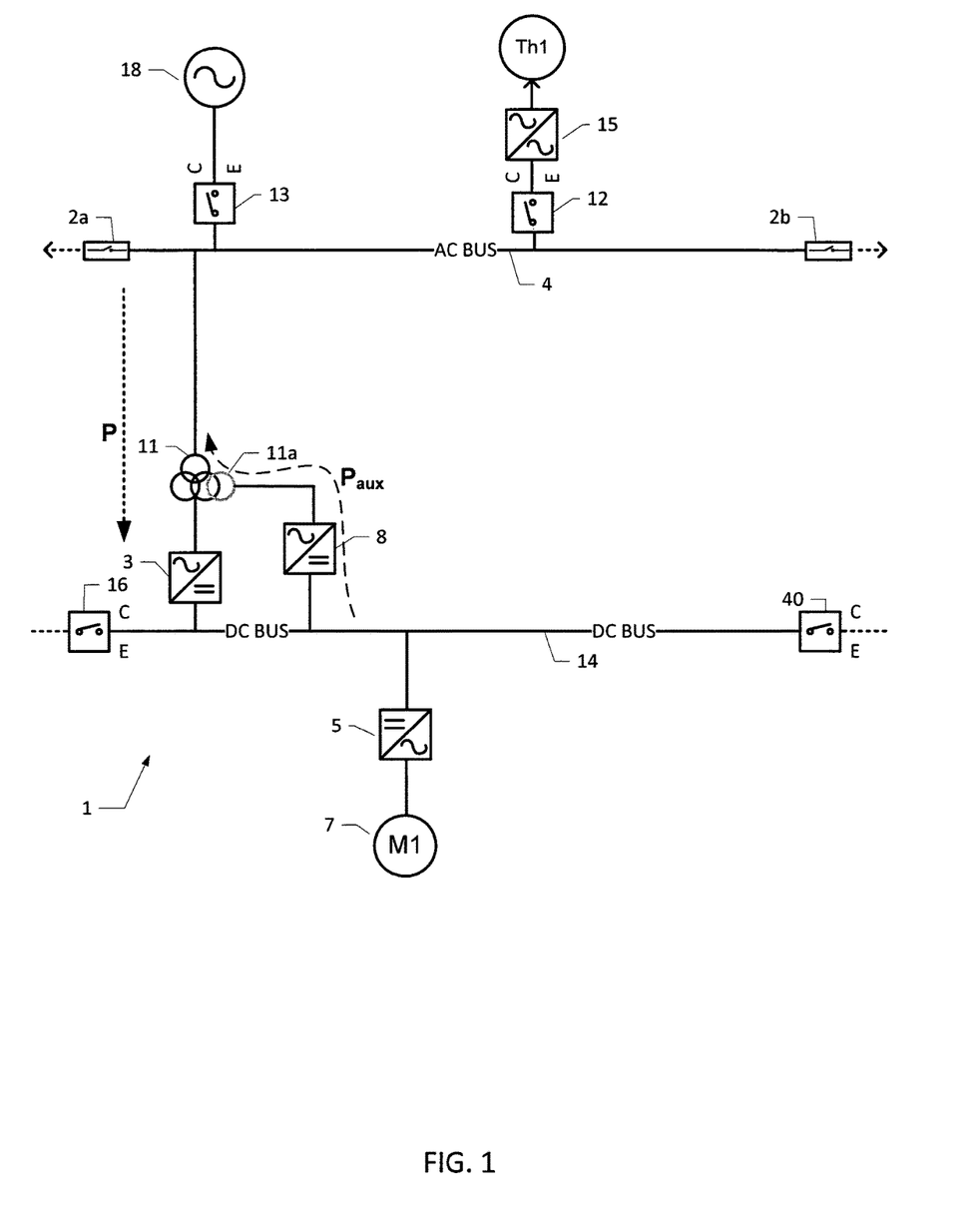
FIG. 1 is a schematic diagram of a power generation and distribution system for a drilling rig in accordance with a first embodiment of the present invention.

FIG. 1 is a simplified schematic diagram of a power generation and distribution system 1 for a drilling rig in accordance with a first embodiment of the present invention. The power generation and distribution system 1 comprises an AC bus 4 and a DC bus 14. The AC bus may comprise a first AC bus tie breaker 2a and a second AC bus tie breaker 2b which electrically connects the AC bus 4 to certain neighbouring segments of a common AC bus of the power generation and distribution system 1 in a multi-segmented embodiment of the power generation and distribution system 1. The DC bus 14 may comprise corresponding DC bus tie breakers 16, 40 configured to electrically divide the DC bus 14 into multiple DC bus neighbouring DC bus segments that each may be selectively isolated from the DC bus 14 by activating and deactivating the DC bus tie breakers 16, 40. The DC bus tie breakers 16, 40 and/or the first and second AC bus tie breaker 2a, 2b may be controlled by a central power management controller (not shown).

The power generation and distribution system 1 additionally comprises an AC generator 118 which is directly connected to the AC bus 4 through an optional generator circuit breaker 13. The AC generator 18 may comprise a synchronous three phase generator which energizes the AC bus 4 during operation of the system 1 unless the circuit breaker 13 is activated to disconnect the AC generator from the AC bus 4. The AC generator 18 may be configured to generate an AC voltage level such as 0.4 kV, 0.6 kV, 0.69 kV, 3 kV, 4 kV, 16 kV, 6 kV, 11 kV, 13 kV, 20 kV, 30 kV but typically between 5 kV and 15 kV such as around 11 kV on the AC bus 4. The power generation and distribution system 1 further comprises an AC bus load directly connected to the AC bus 4 through a load circuit breaker 12. The AC bus load may for example comprise a thruster drive 15 driving an associated thruster Th1. The thruster drive 15 may comprise a variable frequency drive (VFD) or AC-AC power converter to drive an electric motor (not shown) of the thruster Th1 of the drilling rig. The VFD 15 is configured for converting a frequency of the AC bus voltage to another frequency appropriate for driving the thruster drive 15. The thruster drive 15 supplies AC power to rotate a propeller of the thruster Th1. The skilled person will understand that further loads such as a low voltage power distribution bus (not shown) may be directly connected to and powered by the AC bus 4. The power generation and distribution system 1 may comprise a low voltage AC bus (not shown) typically with an voltage level less than 1000 V, such as around 690 V or around 440 V used to power various peripheral power consumers of the drilling rig (i.e. consumers that are not part of the drilling operation or the integrity of the rig/vessel) such as electrical lighting systems, kitchen appliances etc. In some embodiments the low voltage AC has a voltage level that is 20% of the voltage level of the AC bus or less, such as 10% or less, such as 5% or less.

The power generation and distribution system 1 may comprise one or more additional AC generators (not shown) directly connected to the AC bus 4 either between the first and second AC bus tie breaker 2a, 2b or at a distant side of the first and second AC bus tie breaker 2a, 2b. At least one of these additional AC generators may be housed together with the AC generator 18 in a shared generator room. The generator room may be fireproof and/or watertight. The AC generator 18 may possess a maximum power generation capacity larger than 1 MW, or larger than 2 MW, or larger than 5 MW, or larger than 9 MW.

The DC bus 14 is powered by the AC bus 4 (which under normal operating conditions of the system is powered by the AC generator 18) via a three-phase power transformer 11 as illustrated in FIG. 1. The three-phase power transformer 11 is configured to convert three voltage phases of the AC bus 4 into three corresponding secondary side voltage phases at a secondary side of the power transformer 11. A three phase AC-DC power converter 3 is connected between the secondary side voltage phases of the three-phase power transformer 11 and the DC bus 14 for supplying power or energy to DC bus 14. The skilled person will understand that one or more DC bus electrical loads M1 (7) such as a lifting device for the drill floor, a mud pump motor, a cement pump motor, a rotary table motor etc. may be electrically connected to the DC bus 14 of the present power generation and distribution system 1. Certain embodiments of the present power generation and distribution system 1 may comprise an energy storage or device (not shown) directly connected to the DC bus to selectively supply and absorb energy or power of the DC bus 14 as discussed in further detail below with reference to FIGS. 2 and 3. The energy storage may be particularly useful for at least temporarily powering the AC bus 4 through an auxiliary transformer winding 11a in case of a failure of the AC generator 18. As described above, the three-phase power transformer 11 is electrically connected between the AC bus 4 and the DC bus 14 through the three phase AC-DC power converter 3. Hence, during normal operation of the power generation and distribution system 1, the DC bus 14 is powered by the AC bus which in turn is powered by the AC generator 18, or alternatively by one or more further AC generators directly connected to the AC bus 4 depending on how many of these are active at any particular moment of normal operation.

The three-phase power transformer 11 may comprise a plurality of primary side transformer windings and a plurality of secondary side transformer windings (not shown) to convert the three individual voltage phases of the AC bus applied to three primary side windings of the power transformer 11 into the three corresponding voltage phases on three secondary side windings. The plurality of primary side transformer windings and the plurality of secondary side transformer windings are preferably wound around a common magnetic core (not shown) of the transformer 11. The common magnetic core may comprise a single laminated magnetic core. The AC voltage level on the three secondary side windings of the transformer 11 is lower than the AC voltage level on the three primary side windings. The three secondary side windings of the transformer 11 are connected to respective inputs of the three phase AC-DC power converter 3. The three-phase power transformer 11 comprises an auxiliary transformer winding 11a in addition to the plurality, e.g. six, primary side and secondary side transformer windings. The latter could be considered main transformer windings. This auxiliary or further transformer winding 11a is preferably wound around the common magnetic core such that AC voltage and current applied to the auxiliary winding 11a is coupled to each of the three individual primary side transformer windings on the primary side of the transformer 11.

The three individual primary side transformer windings are thereby capable of energizing the individual voltage phases of the AC bus 4 when a second AC-DC power converter 8 is activated or operational. Note, that in the present text term AC-DC converter is applied regardless of the direction of the energy which will be clear from the context. The auxiliary transformer winding 11a is supplied with AC voltage and current from the DC bus 14 through the second AC-DC power converter 8 which has its input side connected directly to the DC bus 14. This flow of power through the auxiliary transformer winding 11a is schematically indicated by power arrow $P_{aux}$ and can be viewed as a "reverse" energy supply path for the AC bus 4 of the system 1. The previously discussed central power management controller may be configured to detecting an AC voltage on the AC bus 4 and further to selectively activating and deactivating the second AC-DC power converter 8 based on the detected AC voltage on the AC bus. The central power management controller may for example compare the detected AC voltage with a certain bus voltage criterion, such as a threshold voltage or other suitable criterion, and activating the second AC-DC power converter 8 if the detected AC voltage complies with the bus voltage criterion—for example that the detected AC voltage is smaller than the threshold voltage. Furthermore, the central power management controller may be configured to deactivate the three phase AC-DC power converter 3 in response to the detected AC voltage level complies with the AC bus voltage criterion to eliminate internal power losses in the three phase AC-DC power converter 3. The deactivation of the three phase AC-DC power converter 3 may also prevent that the powering of the three-phase transformer 11 through the auxiliary transformer winding 11a leads to wasteful energy feedback to the DC bus 14 through the secondary windings of the three phase AC-DC power converter 3. The skilled person will understand that the central power management controller may represent the detected AC voltage on the AC bus in a variety of formats such as RMS voltage, peak voltage, instantaneous voltage, average voltage etc.

In contrast when the detected AC voltage fails to match the bus voltage criterion or criteria, the central power management controller may be configured to activate a "forward" energy supply path comprising the three-phase power transformer 11 and the three-phase AC-DC power converter 3 connected thereto.

The skilled person will appreciate that an AC voltage level on the AC bus 4 below the voltage threshold may indicate that the AC generator 18 is disconnected or defective such that the AC bus 4 is left without an active power/energy supply. In response to this condition, the central power management controller may activate the second AC-DC power converter 8 and thereby energize the AC bus 4 through the auxiliary transformer winding 11a such that the appropriate or nominal AC voltage level on the AC bus 4 is reestablished. Under these circumstances, the DC bus 14 may be energized by energy stored in the energy storage. The capability of the second or "reverse" energy supply path to power the AC bus during generator failure or black-out has several noticeable advantages. One advantage is that the three phase AC-DC power converter 3 may be a unidirectional power converter without any ability to transmit "reverse" power from the DC bus 14 towards the AC bus 4. This reverse transfer of power may instead be carried out by the combination of the auxiliary transformer winding 11a and the second AC-DC power converter 8 operating as a second or "reverse" energy supply path. The size and costs of the unidirectional three phase AC-DC power converter 3 are markedly lower than the costs of a bidirectional counterpart of the same. While the second AC-DC power converter 8 is an additional component, the power rating of the latter converter 8 can often be much smaller than the power rating of the three phase AC-DC power converter 3. The relaxed power rating of the second AC-DC power converter 8 is often achieved because the amount of power in the reverse direction from the DC bus 14 to the AC bus 4 is often significantly smaller than the amount of power in the forward direction. In addition, the second AC-DC power converter 8 may be a unidirectional type of converter leading to additional cost and size decrease.

Figure 2:
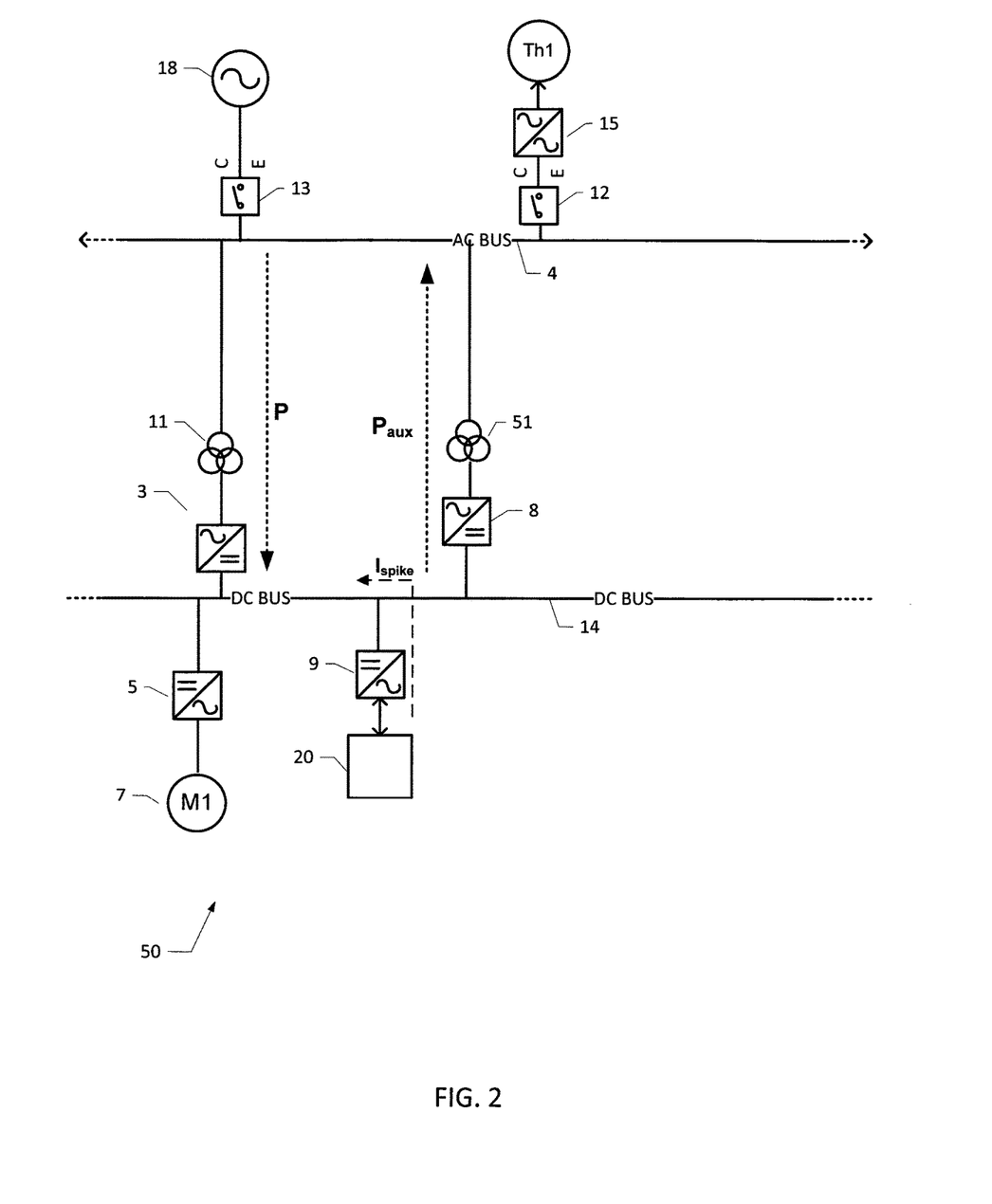
FIG. 2 is a schematic diagram of a power generation and distribution system for a drilling rig in accordance with a second embodiment of the present invention.

FIG. 2 is a simplified schematic diagram of a power generation and distribution system 50 for a drilling rig in accordance with a second embodiment of the present invention. The power generation and distribution system 50 comprises inter alia an AC generator 18, an AC bus 4, a thruster drive 15 driving an associated thruster Th1 and a DC bus 14 similar to the previously discussed embodiment of the power generation and distribution system 1. In the present power generation and distribution system 50, the previously discussed functionality of the auxiliary transformer winding 11a has been replaced by a separate, second, three-phase power transformer 51. An input of the AC-DC power converter 8 or power inverter is directly connected to the DC bus 14 to generate a three-phase AC output voltage. The three-phase AC output voltage of the AC-DC power converter 8 is applied to a plurality of primary side windings of the second three-phase power transformer 51. The second three-phase power transformer 51 thereby generates three secondary side voltage phases that are connected directly to respective voltage phases of the AC bus 4 to energize the latter when the AC-DC power converter 8 is operational. Hence, the combined operation of the AC-DC power converter 8 and the second three-phase power transformer 51 functions as a second or "reverse" energy supply path of the system 50 capable of transmitting power from the DC bus 14 towards the AC bus 4 as schematically indicated by the arrow "$P_{Aux}$".

In contrast, the first or "forward" energy supply path is capable of transmitting power from the AC bus 4 to the DC bus 14 and comprises a first three-phase power transformer 11 connected in series with the previously discussed three phase AC-DC power converter 3. One or both of the first and second three phase AC-DC power converters 3, 8 may be a unidirectional type of power converter for the reasons discussed above. The power generation and distribution system 50 may comprise the previously discussed central power management controller and the latter configured to selectively activating and deactivating each of the first and second three phase AC-DC power converters 3, 8 in accordance with a desired direction of the power flow between the AC bus 4 towards the DC bus 14. The central power management controller may incorporate the previously discussed decision criteria to determine when each of the first and second three phase AC-DC power converters 3, 8 should be activated or deactivated. The skilled person will understand that each of the first and second three phase AC-DC power converters 3, 8 in practice may be deactivated by opening a bus breaker (not shown) connected in series with an input or output of one or both of the first and second three-phase AC-DC power converters 3, 8.

The power generation and distribution system 50 additionally comprises an energy storage assembly or device 9, 20 directly connected to the DC bus 14 to selectively supply and absorb energy or power of the DC bus 14. The energy storage assembly 9, 20 may comprise a flywheel energy storage device 20 for example with the properties discussed in detail below with reference to FIG. 3. The flywheel energy storage device 20 is capable of nearly instantaneously supply large currents, $I_{spike}$, onto the DC bus 14 and thereby effectively suppress voltage spikes on the DC bus caused by the previously discussed intermittent peak power loads drawn by one or more of the DC bus electrical loads 5, 7 (M1), in particular the lifting device for the drill floor. Hence, the flywheel energy storage device 20 is arranged to perform peak-shaving of DC bus 14. The energy storage assembly 9, 20 may in addition be useful for at least temporarily reversely powering the AC bus 4 through the combined operation of the AC-DC power converter 8 and second three-phase power transformer 51 in case of a failure of the AC generator 18. In contrast, during normal operation of the power generation and distribution system 50, the DC bus 14, and its DC bus loads 5, 7, may be powered by the AC bus 4 which in turn is powered by the AC generator 18, or alternatively by one or more further AC generators directly connected to the AC bus 4 depending on how many of these are active at any particular moment of normal operation of the system. One noticeable advantage of the "reverse" power transmission capability of the power generation and distribution system 50 is the ability to increase average loading of the active AC generator 18 or a plurality of AC generators connected to the AC bus. The average loading of the active AC generator or generators may be increased because of the energy back-up of the flywheel energy storage device 20 in conjunction with the ability to selectively transfer this energy as required to the AC bus 4 via the AC-DC power converter 8 and second three-phase power transformer 51. The energy/power supplied by the flywheel energy storage device 20 reduces the required peak power demand from the active AC generator(s) because energy for intermittent power peaks or spikes on the AC bus subsection 4 may be supplied by the flywheel energy storage device 20 instead of the active AC generator(s). The flywheel energy storage device 20 may in one embodiment of the invention possess sufficient energy to drive the thruster Th1 on the AC bus 4 for predetermined amount of time during an emergency state of the power system for example a so-called Emergency Shut Down (ESD) of the power system. The powering of the thruster Th1, and possibly other thrusters, is critical under numerous drilling rig operations that require the ability to dynamically maintain a certain position of the drilling rig in the sea.

Figure 3:
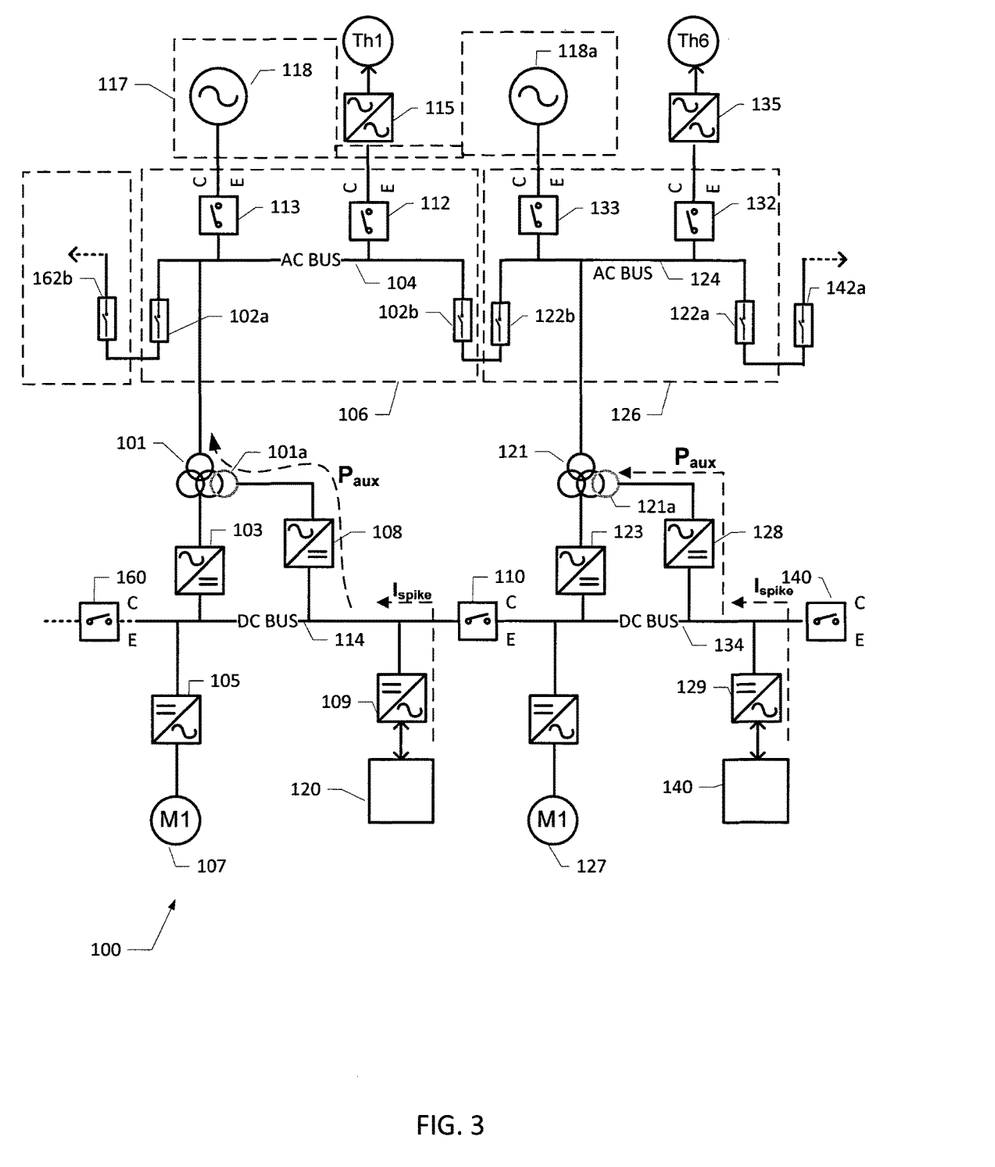
FIG. 3 is a schematic diagram of a power generation and distribution system for a drilling rig comprising a plurality of AC bus subsections and DC bus subsections in accordance with a third embodiment of the present invention.

FIG. 3 is a simplified schematic diagram of a power generation and distribution system for a drilling rig in accordance with a third embodiment of the present invention. The present power generation and distribution system possesses a multi-segmented topology comprising a plurality of connectable AC bus subsections and plurality of connectable DC bus subsections. The skilled person will understand that the power generation and distribution system may comprise two or more electrically connectable power system sections 100 where each of these power system sections may be substantially identical to the illustrated first power system section 100. A second power system section and third power system section may for example be connected to right side and left side, respectively, of the first power system section 100 via respective AC bus connections and DC bus connections as discussed in additional detail below.

The first power system section 100 comprises a first AC bus tie breaker 102a which electrically connects a first segment 104 of a first AC bus subsection of the first power system section 100 to a corresponding AC bus subsection of the second power system section (not shown) through tie breaker 162b and 122b of the second power system section. A first DC bus tie breaker 160 is configured to electrically connect a first segment 114 of the DC bus subsection to a corresponding DC bus subsection of the second power system section. Likewise, a second AC bus tie breaker 122a electrically connects a second segment 124 of the AC bus subsection (AC BUS) of the first power system section 100 to a corresponding AC bus subsection of the third power system section (not shown) through tie breaker 142a of the third power system section. A second DC bus tie breaker 140 electrically connects a second segment 134 of the DC bus subsection (DC BUS) to a corresponding DC bus subsection of the third power system section. The skilled person will understand that the first and second segments 104, 124 of the first AC bus subsection and the corresponding bus segments of the additional AC bus subsections of the second and third power system sections may form part of a common AC bus of the power generation and distribution system. Likewise, the first and second segments 114, 134 of the first DC bus subsection and the corresponding bus segments of the additional DC bus subsections of the second and third power system sections may form part of a common DC bus of the power generation and distribution system. Generally, in some embodiments a bus connection between two separate rooms with each a part of the common bus require bus couplers in each room. In one exemplary embodiment of the present power generation and distribution system the respective AC bus subsections of the two or more power system sections are electrically connected in a so-called ring configuration such that the common AC bus possesses a ring configuration in certain types of applications such as dynamic positioning vessels. The respective DC bus subsections of the two or more power system sections are preferably also electrically connected in a ring configuration such that the common DC bus possesses a ring configuration. The ring configuration of the common AC bus has the advantage that even if a single AC bus subsection such as the illustrated first AC bus subsection 104, 124 is disconnected from the common AC bus by the second and third AC bus tie breakers 102a, 102b arranged at respective ends of the first AC bus subsection all the remaining AC bus subsection(s) may remain powered. The second and third AC bus tie breakers 102a, 102b are operable to selectively disconnect and connect the first AC bus subsection to/from the common AC bus and may be controlled by a suitable central power management/supervision controller (not shown). The first AC bus subsection may be disconnected from the common AC bus for various reasons for example in the event of an AC generator 18 failure or a short circuit on a load or component connected to the first AC bus subsection. The first power system section 100 additionally comprises the first AC generator 18 which is electrically connected to the first segment 104 of the AC bus subsection through a first generator circuit breaker 113. The first AC generator 18 may comprise a synchronous three-phase generator which at least energizes the first segment of the AC bus subsection 104 during operation of the first power system section 100 unless the circuit breaker 113 is active to disconnect the first AC generator. The first AC generator 18 may be configured to generate an AC voltage level between 5 kV and 15 kV (or any of the AC voltage levels cited above) such as around 11 kV on the first segment of the AC bus subsection 104. A first thruster drive 115 is electrically connected to the first segment of the AC bus subsection 104 through a first thruster circuit breaker 112. The first thruster drive 115 may comprise a variable frequency drive (VFD) or AC-AC power converter to drive an electric motor (not shown) of the first thruster Th1 of the drilling rig. The VFD unit is configured for converting a frequency of the supplied AC voltage on the first segment 104 of the AC bus subsection to an appropriate frequency for operating the first thruster drive 115. The first thruster drive 115 supplies AC power to rotate a propeller of the first thruster Th1. The skilled person will understand that further loads such as a low voltage power distribution bus (not shown) may be connected to and powered by the first segment 104 of the AC bus subsection. The low voltage power distribution bus may comprise a low voltage AC bus or a low voltage DC bus with an AC voltage level around 127 V, 230 V, 440 V, 480 V and 690 V and DC voltage level around 6 V, 12 V, 24 V, 48 V, 110 V and 220 V be used to power various peripheral power consumers of the drilling rig such as electrical lighting systems, kitchen appliances etc.

The first power system section 100 additionally comprises a second AC generator 118A which is electrically connected to the second segment of the AC bus subsection 124 through a second generator circuit breaker 133. The second AC generator 118a may be substantially identical to the first AC generator 18 and operational to at least energize the second segment of the AC bus subsection 124 during operation of the first power system section 100 unless the circuit breaker 133 is active to disconnect the second AC generator. A second thruster drive 135 is electrically connected to the second segment of the AC bus subsection 124 through a second thruster circuit breaker 132. The skilled person will understand that the second thruster drive 135 and a second thruster Th6 connected thereto may be substantially identical to the first thruster drive 115 and first thruster Th1 discussed above.

The first and second segments 104, 124 of the AC bus subsection are electrically connected through series connected third and fourth bus tie breakers 102b, 122b, respectively. The third and fourth bus tie breakers 102b, 122b are accordingly operational to selectively connect and disconnect the first and second segments 104, 124 of the AC bus subsection. The third bus tie breaker 102b is arranged or housed inside a first switchboard compartment 106 while the fourth bus tie breaker 122a is arranged or housed inside a second and physically separate switchboard compartment 126. The first and second switchboard compartments 106, 126 are preferably physically isolated from each other by fireproof and watertight walls of the compartments. There are several noticeable advantages by the use of two series connected bus tie breakers 102b, 122b housed in two separate switchboard compartments 106, 126 to separate the first and second segments 104, 124 of the AC bus subsection, instead of a single physical compartment housing a single bus tie breaker as used in prior art drilling rig power distribution systems. In case of a single point failure where one of the first and second switchboard compartments 106, 126 is flooded or otherwise damaged and left non-functional, the other switchboard compartment may be undamaged such that the AC generator and thruster connected to the still functional segment of the AC bus subsection remain operative. Hence, the single point failure only leads to the loss of only a single AC generator and a single thruster connected thereto in the present power generation and distribution system instead of a loss of both the first and second AC generators and the first and second thrusters associated therewith as in prior art drilling rig power distribution systems. The first and second AC generators 118, 118a may be housed in a shared generator room 117 as schematically indicated in the drawing.

To appreciate the advantages of the separate switchboard compartments one can consider a typical drilling rig power generation and distribution system that may comprise 6 thrusters connected to, and powered by the common AC bus of the drilling rig power generation and distribution system. In addition, the common AC bus of such a typical drilling rig power generation and distribution system is powered by six AC generators each possessing a certain maximum power generation capacity for example larger than 1, 2, 5 or 9 MW. For example, in some embodiments there is a minimum requirement to comply with standards requirements (such as DP3) which may be the availability of exemplary 20, 24 MW or even 26 MW of thruster power even with a single point failure such as flooding of a switchboard compartment or an engine room. Hence, a flooding of the switchboard compartment in the above-discussed prior art drilling rig power distribution systems leads to the loss of two thrusters. In a case with 6 minimum power requirement of each of the six thrusters is 5, 6 or 6.5 MW (the power requirement divided by the 4 remaining thrusters). In contrast, the same single point failure in the power generation and distribution system in accordance with the present invention only leads to the loss of the single thruster associated with the single failing switchboard compartment such that the minimum power requirement of each of the six thrusters is reduced to 3.3, 4.8 or 5.2 MW (the power requirement divided by the 5 remaining thrusters). Similar advantages may be found for e.g. an 8 thruster configuration. This marked decrease of thruster power requirement leads to smaller dimensions, considerably reduced costs and better power efficiency of each of the six thrusters.

The skilled person will understand that even if the shared generator room 117, where the first and second AC generators 118, 118a are situated, there will in some embodiments be sufficient generator capacity to power the remaining (e.g. four, five or six thrusters) because the remaining functional AC generators connected to the common AC bus, after the disconnection of the first and second AC generators 118, 118a (by activating the first and second generator circuit breakers 113, 133), still possess a power generation capacity of e.g. 36 MW when 9 MW generators are used. As mentioned, other generators with other power levels are feasible.

In some embodiments the power system comprises two or more power system sections according to any of the claims, such as three or more, such as 4 or more. Typically a drilling rig will have between 4 or more (such as 4, 5, 6, 7 or 8) AC generators for example 6 AC generators in which case each AC generator will be allocated to a particular segment of the three power system sections. In some embodiments each set of the first and second generators from each power system section are housed in a shared generator room which is typically fireproof and/or watertight. Hence, with 6 AC generators on the drilling rig or vessel these will be placed in three generator rooms. However, further safety and/or freedom of design capacity relative to single-point failure scenarios may be obtained by placing each AC generator (also referred to as a genset) in a separate room so that the first and second generators are separated from each other in separate generator rooms which typically are fireproof and/ or watertight.

One embodiment of the first power system section 100 of the present power generation and distribution system comprises a DC bus subsection that is powered from the first and second segments 104, 124 of the first AC bus subsection via first and second three-phase power transformers 101, 121 as illustrated in FIG. 1. This embodiment of the invention comprises the first three-phase power transformer 101 electrically connected between the first segment 104 of the AC bus subsection and a first segment 114 of the DC bus subsection through a first three phase AC-DC power converter 103. The skilled person will understand that one or more DC bus electrical loads 107 (M1) such as the lifting device for the drill floor, a mud pump motor, a cement pump motor, a rotary table motor etc. may be electrically connected to the first segment 114 of the DC bus subsection for example via respective DC circuit breakers (not shown). Note, that the loads M1 107 and M1 127 is not necessarily of the same kind. The skilled person will understand that the one or more DC bus electrical loads may be connected to the DC bus subsection via respective unidirectional AC-DC power converters. Each of the AC-DC power converters may comprise a variable frequency and/or variable output voltage type of converter. Likewise, a second three-phase power transformer 121 is electrically connected between the second segment 124 of the AC bus subsection and a second segment 134 of the DC bus subsection through a second three phase AC-DC power converter 123. The skilled person will understand that one or more further DC bus electrical loads 107 (M1) such as the lifting device for the drill floor, a mud pump motor, a cement pump motor, a rotary table motor etc. may be electrically connected to the second segment 134 of the DC bus subsection for example via respective DC circuit breakers (not shown). A DC segment circuit breaker 110, also called bus coupler, is configured to selectively electrically connect and disconnect the first and second segments 114, 134 of the DC bus subsection. The DC segment circuit breaker 110 may be controlled by the previously discussed central power management or supervision controller and the same applies for the previously discussed first and second DC bus tie breaker 140, 160 arranged at respective ends of the DC bus subsection. This feature allows the central power management/supervision controller to electrically isolate each of the first and second segments 114, 134 of the DC bus subsection from each other and/or electrically isolate the entire DC bus subsection from the common DC bus of the power generation and distribution system if or when needed.

The first segment 114 of the DC bus subsection comprises a first energy storage 109, 120 electrically connected to the first segment 114 of the DC bus subsection to selectively supply power to the first segment 114 of the DC bus subsection and absorb power from the first segment 114 of the DC bus subsection in accordance with a supply control signal (not shown). The first energy storage preferably comprises a flywheel energy storage device 120 and may comprise other types of energy storage devices such as rechargeable batteries. The flywheel energy storage device 120 is electrically connected to the first segment 114 of the DC bus subsection through a bidirectional AC-DC power converter 109 allowing the assembly to either supply power to the DC bus subsection to for example feed power to the DC bus electrical loads 107 or absorbing power from the DC bus subsection and storing absorbed power in the flywheel 120 as kinetic energy via an integral AC motor/generator coupled to a rotating wheel member or members of the flywheel 120.

The presence of the first energy storage with the bidirectional power transfer capability to the DC bus subsection entails numerous advantages. The first energy storage is capable of nearly instantaneously supplying large currents, $I_{spike}$, onto the common DC bus subsection and thereby effectively suppressing voltage spikes on the DC bus caused by the previously discussed intermittent peak power loads drawn by one or more of the DC bus electrical loads, in particular the lifting device for the drill floor for example the drawworks motor. The first energy storage 109, 120 may be charged from power on the DC bus subsection 114 generated by the AC generator 118 and supplied via the AC bus subsection, the first three-phase power transformer 101 and the first three phase AC-DC power converter 103. The first energy storage 109, 120 may additionally or alternatively be charged by regenerative energy captured from braking energy of the one or more of the DC bus electrical loads 107 such that the power production requirements on the AC generator 118 decreases and its fuel consumption lowered. The first energy storage 109, 120 is also important to various safety issues with well control and circulation of drilling mud and control of the lifting device for the drill floor because of the ability of the storage assembly to supply back-up power to the DC bus subsection 114 for a prolonged period of time if the ordinary power supply from the AC generator 118 (through the three phase high voltage transformer 101) for any reason fails. The first energy storage 109, 120 preferably comprises a flywheel device 120 as mentioned above which adds further advantageous properties to the energy storage for example a high energy density, long lifetime, rapid charging and large maximum power output. The large maximum power output of the flywheel based energy storage makes it very effective in suppressing the previously discussed voltage spikes on the DC bus subsection. The flywheel energy storage device 120 may possess a peak power delivery capability larger than 2.0 MW, i.e. 3000 A at 720 V DC-1000 V DC onto the common DC bus. In general, it may be advantageous for the flywheel energy storage device 120 to possess an energy storage capacity of such as 360 MJ or more, such as 500 MJ or more, such as 1200 MJ or more and may be designed to meet a particular driving time of the atleast two, e.g. thrusters Th1 and Th6, and optionally of certain essential auxiliary loads such as the steering system for ships and semi submersibles.

Generally Critical loads related to the drilling operation is typically one or more of the follow at least for a time sufficient to close the well (such as 3 minutes or more, such as 5 minutes or more, such as 8 minutes or more, such as 10 minutes or more): Hoisting system, Mud pumps (may be load constrained to a minimum power), cement pump constant load or with a ramp, top drive, mixing pumps (typically low voltage bus), and hydraulic HPU for drill floor supplying the drill floor machines and equipment for managed pressure drilling. Critical auxiliary (non-drilling) loads may include one or more of Thruster 1+6, Anchor winch (typically DC bus or low voltage AC bus), ballast bilge pumps (typically low voltage AC bus) and fire pumps (typically high voltage AC bus or low voltage AC bus) and cranes (typically high voltage AC bus or low voltage AC bus). In some embodiment the energy storage comprises sufficient energy to drive both drilling and auxiliary loads in 3 minutes or more, such as 5 minutes or more, such as 8 minutes or more, such as 10 minutes or more.

Finally, the first energy storage 109, 120 is highly useful for temporarily powering the first segment 104 of the AC bus subsection through a failure of AC generator 118.

As described above, the first three-phase power transformer 101 is electrically connected between the first segment 104 of the AC bus subsection and the first segment 114 of the DC bus subsection through the first three phase AC-DC power converter 103. Hence, during normal operation of the first power system section 100 the DC bus subsection 114 is powered by the first segment 104 of the common AC bus which in turn is powered by the first AC generator 118, or one or more remaining AC generators in the power plan sections depending on how many of these are active at any particular moment of operation. The first three-phase power transformer 101 may comprise a plurality of primary side transformer windings and a plurality of secondary side transformer windings (not shown) to convert three individual voltage phases of the AC bus subsection applied to three primary side windings into three corresponding voltage phases on three secondary side windings. The plurality of primary side and secondary side transformer windings are preferably wound around a common magnetic core. The common magnetic core may comprise a single laminated magnetic core. The AC voltage level on the three secondary side windings is lower than the AC voltage level on the three primary side windings. The three secondary side windings of the transformer 101 are connected to respective inputs of the first three phase AC-DC power converter 103. However, the first three-phase power transformer 101 comprises an auxiliary transformer winding 101a in addition to the plurality, e.g. six, primary side and secondary side transformer windings which could be considered main transformer windings. This auxiliary transformer winding 101a is preferably wound around the common magnetic core such that AC voltage and current applied to the auxiliary winding 101a is coupled to each of the three individual primary side transformer windings on the primary side of the transformer 101. The three individual primary side transformer windings are thereby energizing the individual voltage phases of the first segment 104 of the AC bus subsection. The auxiliary transformer winding 101a is supplied with AC voltage and current from the first segment 114 of the DC bus subsection through a second AC-DC power converter 108 coupled between the first segment 114 of the DC bus subsection and the auxiliary transformer winding 101a. The flow of this AC voltage and current through the auxiliary winding 101a is schematically indicated by power arrow $P_{aux}$. The previously discussed central power management/supervision controller may be configured to control when the second AC-DC power converter 108 is activated such that the auxiliary winding 101a is energized. The central power management controller may for example monitor an AC voltage level on the first segment 104 of the AC bus subsection and activate the second AC-DC power converter 108 if the AC voltage level falls below a certain voltage threshold or other suitable criterion. An AC voltage level below this voltage threshold may indicate that the AC generator 118 is disconnected or failing such that the AC bus subsection is left without power supply. In response to this condition, the central power management controller may decide to activate the second AC-DC power converter 108 and energize the first segment 104 of the AC bus subsection via the auxiliary winding 101a such that the appropriate or nominal AC voltage level is reestablished. Under these circumstances, the first segment 114 of the DC bus subsection may be energized by energy stored in the flywheel energy storage device 120 through power converter 109. The capability of the first three-phase power transformer 101 to power the first segment 104 of the common AC bus through the auxiliary winding 101*a* during generator failure has several noticeable advantages. One advantage is that the first three phase AC-DC power converter 103 may be a unidirectional power converter without the ability to transmit "reverse" power from the DC bus subsection 114 to the AC bus subsection 104. This reverse transfer of power may instead be handled by the auxiliary transformer winding 101*a* and the second AC-DC power converter 108. The size and costs of a unidirectional version of the three phase AC-DC power converter 103 are typically markedly lower than the costs of a bidirectional counterpart of the same. While the second AC-DC power converter 108 is an additional component, the power rating of the latter converter can often be much smaller than the power rating of the three phase AC-DC power converter 103, because markedly less power is often needed in the reverse direction. Typically, because either the number of consumers have been restricted to the most critical and/or some or all consumers have been power limited. In both cases to ensure that critical can functions can be performed. Another noticeable advantage of the ability of the first power system section 100 to transmit "reverse" power from the DC bus subsection 114 to the AC bus subsection 104 is the ability to increase average loading of each of the active AC generators and thereby achieve a reduction of the number of simultaneously active AC generators. The reduction of the number of simultaneously active AC generators is achieved because of the energy back-up from the flywheel energy storage device 120 and in some embodiments in conjunction with the ability to selectively transfer this energy when required to the AC bus subsection 104 via the second AC-DC power converter 108 and auxiliary transformer winding 101*a*. The energy back-up reduces the required peak power demand from the active AC generators of the present drilling rig power generation and distribution system because energy for intermittent power peaks or spikes on the AC bus subsection 104 is supplied by the energy back-up (typically to the DC bus) instead of the active AC generators. Hence, the present drilling rig power generation and distribution system may operate with a smaller number of active AC generators each running with a higher average loading than conventional power systems for drilling rigs. The higher average loading of the active AC generators typically increases the efficiency of each active AC generator and reduces its fuel consumption and pollution. This is particularly true for combustion based AC generators such as diesel generators.

In addition, the energy back-up from the flywheel energy storage device 120 may be used to power the previously discussed low voltage power distribution bus connected to the AC bus subsection 104 during tripping or failure of the first AC generator 118. In this manner, the power supply to the various peripheral power consumers of the drilling rig such as electrical lighting systems, water cooling systems, service air systems, kitchen appliances etc. remains undisturbed of the generator failure.

The flywheel energy storage device 120 may in one embodiment of the invention possess sufficient energy to drive one or both of the thrusters Th1 and Th6 by energizing the first segment 104 of the AC bus subsection and, optionally, the second segment 124 of the AC bus subsection and/or the DC bus section 114 for predetermined amount of time during an emergency state of the power system for example a so-called Emergency Shut Down (ESD) of the power system. In general it may often be sufficient to only power a few thrusters to hold a DP-vessel sufficiently in position during an emergency. For example, on a ship these thrusters may be forward and aft most thrusters. In this example these the powering of the thrusters Th1 and Th6, and possibly other thrusters, is critical under numerous drilling rig operations that require the ability to dynamically maintain a certain position of the drilling rig in the sea. The second energy storage 140 (including its converter 129) comprising a second flywheel energy storage device is electrically connected to the second segment 134 of the DC bus subsection and may be operative to energize the second segment 124 of the AC bus subsection through an auxiliary transformer winding 121*a* of the second three-phase power transformer 121 in a corresponding manner to the first three-phase power transformer 101. In this manner, the first and second flywheel energy storage devices 120, 140 may cooperate to powering of the first and second thrusters Th1 and Th6 by energizing the first and second segments 104, 124 of the AC bus subsection.

The invention claimed is:

1. A power generation and distribution system for a drilling rig comprising:
    an AC bus and a DC bus,
    an AC generator electrically connected to the AC bus,
    an AC bus load electrically connected to the AC bus,
    a first power transformer configured to convert a plurality of voltage phases of the AC bus into a plurality of corresponding secondary side voltage phases,
    a first unidirectional AC-DC power converter connected between the secondary side voltage phases of the first power transformer and the DC bus for supplying power to the DC bus,
    one or more DC bus loads connected to the DC bus, and
    a second AC-DC power converter connected between the DC bus and at least one of an auxiliary transformer winding of the first power transformer and a second power transformer for supplying power from the DC bus to the AC bus.

2. The power generation and distribution system according to claim 1, wherein the first power transformer comprises: a plurality of primary side transformer windings and a plurality of secondary side transformer windings wound around a common magnetic core wherein the auxiliary transformer winding is wound around the common magnetic core to energize the plurality of primary side transformer windings.

3. The power generation and distribution system according to claim 1, further comprising a power management controller configured to:
    detect one or more parameters of the AC bus,
    selectively activate and deactivate each of the first AC-DC power converter and the second AC-DC power converter based on the one or more detected parameters of the AC bus.

4. The power generation and distribution system according to claim 3, wherein the power management controller is configured to: compare an AC voltage on the AC bus to at least one AC bus voltage threshold and based on said comparison:
    deactivate the first AC-DC power converter; and
    activate the second AC-DC power converter to energize at least one of the auxiliary transformer winding and the second power transformer from the DC bus.

5. The power generation and distribution system according to claim 1, wherein the second AC-DC power converter is a unidirectional power converter configured for transmission of energy from the DC bus to at least one of the auxiliary transformer winding and the second power transformer.

6. The power generation and distribution system according to claim 1, further comprising: a first energy storage connected to the DC bus to selectively supply power to the DC bus and absorb power from the first DC bus in accordance with a control signal.

7. The power generation and distribution system according to claim 6, wherein the first energy storage comprises one or more energy storage devices selected from a group of {a rechargeable battery, a capacitor, a flywheel}.

8. The power generation and distribution system according to claim 7, comprising a flywheel energy storage device possessing an energy storage capacity of more than 360 MJ.

9. The power generation and distribution system according to claim 6, wherein the first energy storage is arranged to carry out peak-shaving of the DC bus by at least temporarily supplying power to respective peak power demands of the one or more DC bus loads.

10. The power generation and distribution system according to claim 1, wherein the one or more DC bus loads comprises at least one of: a lifting device with a lifting capacity larger than 500 tons for a drill floor, a mud pump motor, a cement pump motor, a rotary table motor.

11. The power generation and distribution system according to claim 1, wherein the AC bus load comprises a thruster driver electrically connected to the AC bus.

12. The power generation and distribution system according to claim 1, wherein the AC bus comprises a plurality of AC bus subsections, wherein each AC bus subsection comprises first and second bus tie breakers for selectively connecting and disconnecting the AC bus subsection to the AC bus; and
the DC bus comprises a plurality of DC bus subsections, wherein each DC bus subsection comprises first and second bus tie breakers for selectively connecting and disconnecting the DC bus subsection to the DC bus.

13. The power generation and distribution system according to claim 12, wherein the plurality of AC bus subsections are electrically connected to the AC bus in a ring configuration; and/or the plurality of DC bus subsections are electrically connected to the DC bus in a ring configuration.

14. The power generation and distribution system according to any of the preceding claims, wherein each of the AC generator, the AC bus load and the first power transformer are directly connected to the AC bus without any intervening AC or DC bus planes or AC or DC bus lines.

15. The power generation and distribution system according to claim 1, wherein each of the first unidirectional AC-DC power converter and the one or more DC bus loads are directly connected to the DC bus without any intervening AC or DC bus planes or structures.

16. A method of generating and distributing power on a drilling rig comprising:
connecting an AC generator to an AC bus and running the AC generator to energize the AC bus with an AC voltage,
loading the AC bus by connecting one or more AC loads to the AC bus,
monitoring and detecting one or more parameters of the AC bus,
comparing the one or more parameters of the AC bus to a bus voltage criterion, and
if the one or more parameters of the AC bus do not match the bus voltage criterion, then activating a first unidirectional energy supply path from the AC bus to a DC bus to energize the DC bus and deactivating a second energy supply path from the DC bus to the AC bus; or if the one or more parameters of the AC bus match the bus voltage criterion, then deactivating the first energy supply path and activating the second energy supply path from the DC bus to the AC bus to energize the AC bus.

17. The method of generating and distributing power on a drilling rig according to claim 16, wherein the first energy supply path comprises:
a first multi-phase power transformer configured to convert a plurality of voltage phases of the AC bus into a corresponding plurality of secondary side voltage phases and a first AC-DC power converter configured to convert the plurality of secondary side voltage phases to a DC voltage; and the second energy supply path comprises:
a second AC-DC power converter connected between the DC bus and at least one of an auxiliary transformer winding of the first power transformer and a second power transformer, wherein a secondary side of the second power transformer is connected to the AC bus.

18. The method of generating and distributing power on a drilling rig according to claim 16, further comprising:
connecting one or more DC bus loads to the DC bus,
connecting a flywheel energy storage device to the DC bus, and
controlling the flywheel energy storage device to selectively supply stored energy to the DC bus and absorb energy from the DC bus.

19. The method of generating and distributing power on a drilling rig according to claim 18, wherein the flywheel energy storage device is arranged to carry out peak-shaving of the DC bus by at least temporarily supplying power to respective peak power demands of the one or more DC bus loads.

20. The method of generating and distributing power on a drilling rig according to claim 16, further comprising supplying energy from a flywheel energy storage device to the AC bus through the second energy supply path.

* * * * *